United States Patent [19]

Dennis et al.

[11] 4,376,305
[45] Mar. 8, 1983

[54] AUTOMATIC RECORD PLAYER

[75] Inventors: James T. Dennis, P.O. Box 15100, Oklahoma City, Okla. 73155; George Kolomayets, Chicago, Ill.

[73] Assignee: James T. Dennis, Oklahoma City, Okla.

[21] Appl. No.: 211,369

[22] Filed: Nov. 28, 1980

Related U.S. Application Data

[60] Division of Ser. No. 9,254, Feb. 5, 1979, Pat. No. 4,291,886, which is a continuation of Ser. No. 813,225, Jul. 5, 1977, abandoned.

[51] Int. Cl.$^3$ ............................................. G11B 17/04
[52] U.S. Cl. .................................... 369/210; 369/243
[58] Field of Search ................ 369/210, 211, 233, 243

[56] References Cited

U.S. PATENT DOCUMENTS

| | | | |
|---|---|---|---|
| 3,400,935 | 9/1968 | Kolomayets et al. | 369/210 |
| 3,650,539 | 3/1972 | Vazzano | 369/209 |
| 3,827,698 | 8/1974 | Sostero | 369/210 |
| 3,853,326 | 12/1974 | Atsumi | 369/209 |

Primary Examiner—Steven L. Stephan
Attorney, Agent, or Firm—Mason, Kolehmainen, Rathburn & Wyss

[57] ABSTRACT

An extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is moved or restrained during the record changing cycle. The presence or absence of a record on the spindle shelf is sensed by blade means which is moved in the direction of the shelf during the initial portion of the record changing cycle. If no record is present on the shelf, the tone arm is lowered into engagement with a retaining notch on the rest post at a point somewhat before mid cycle and the turntable motor is turned off at the end of this last record shutoff cycle.

21 Claims, 11 Drawing Figures

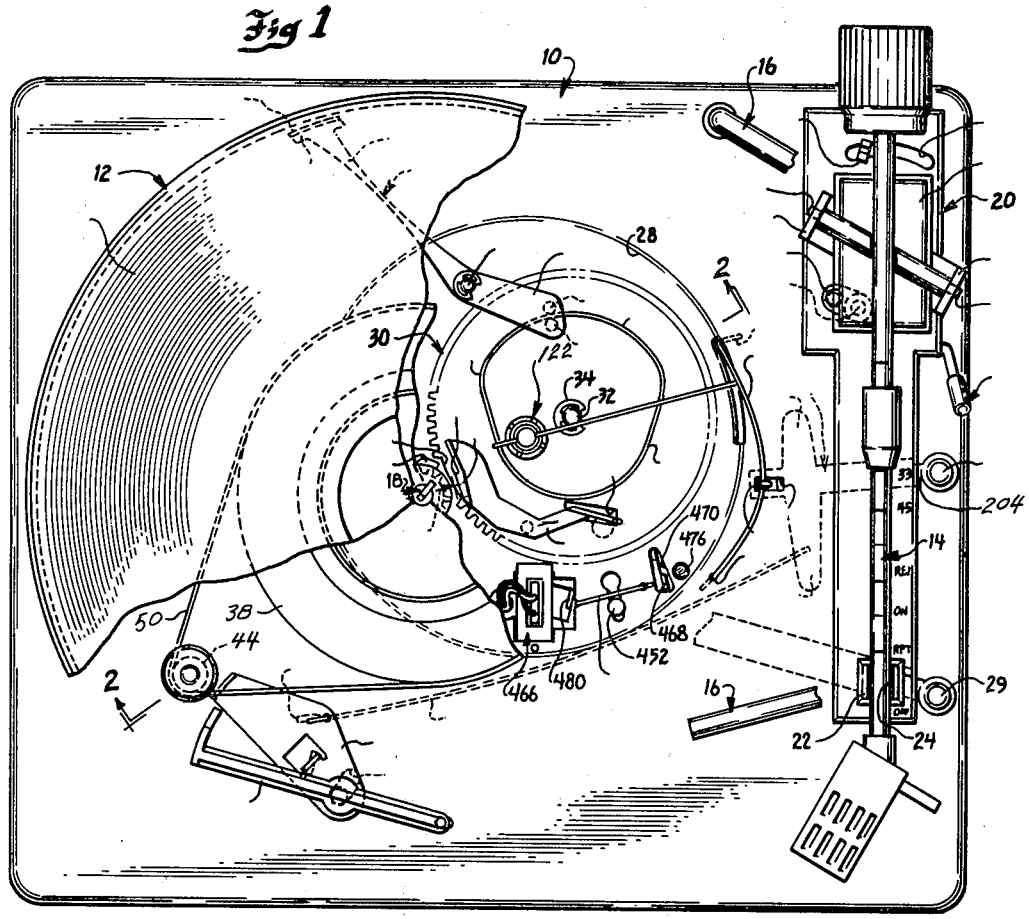
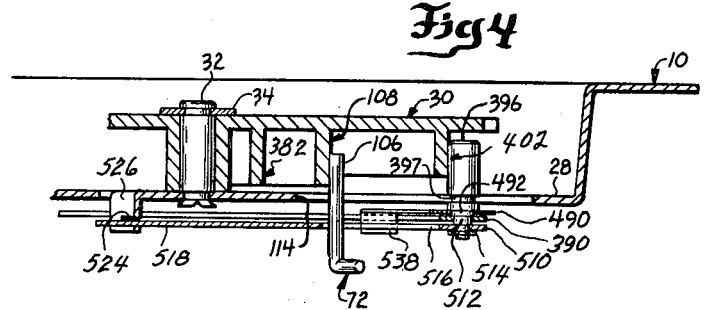

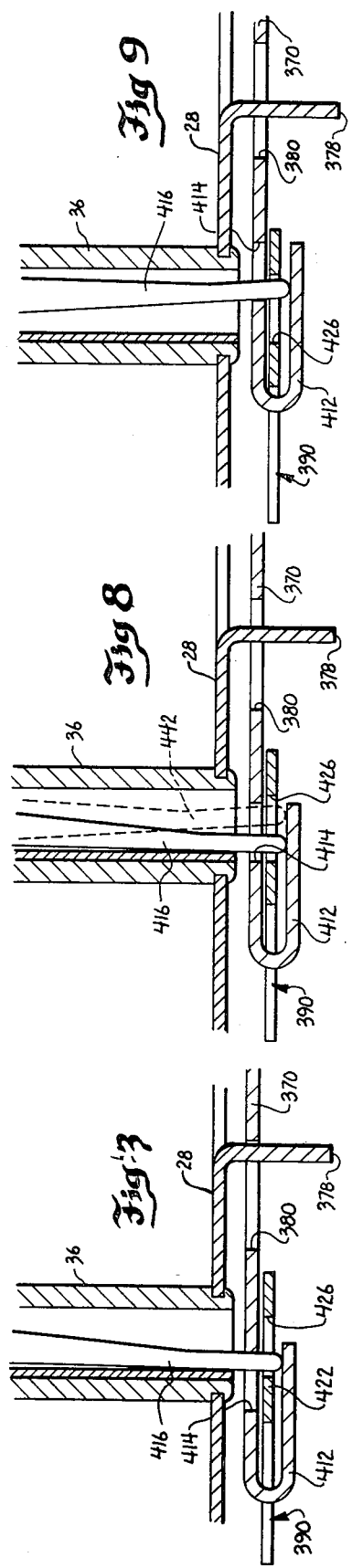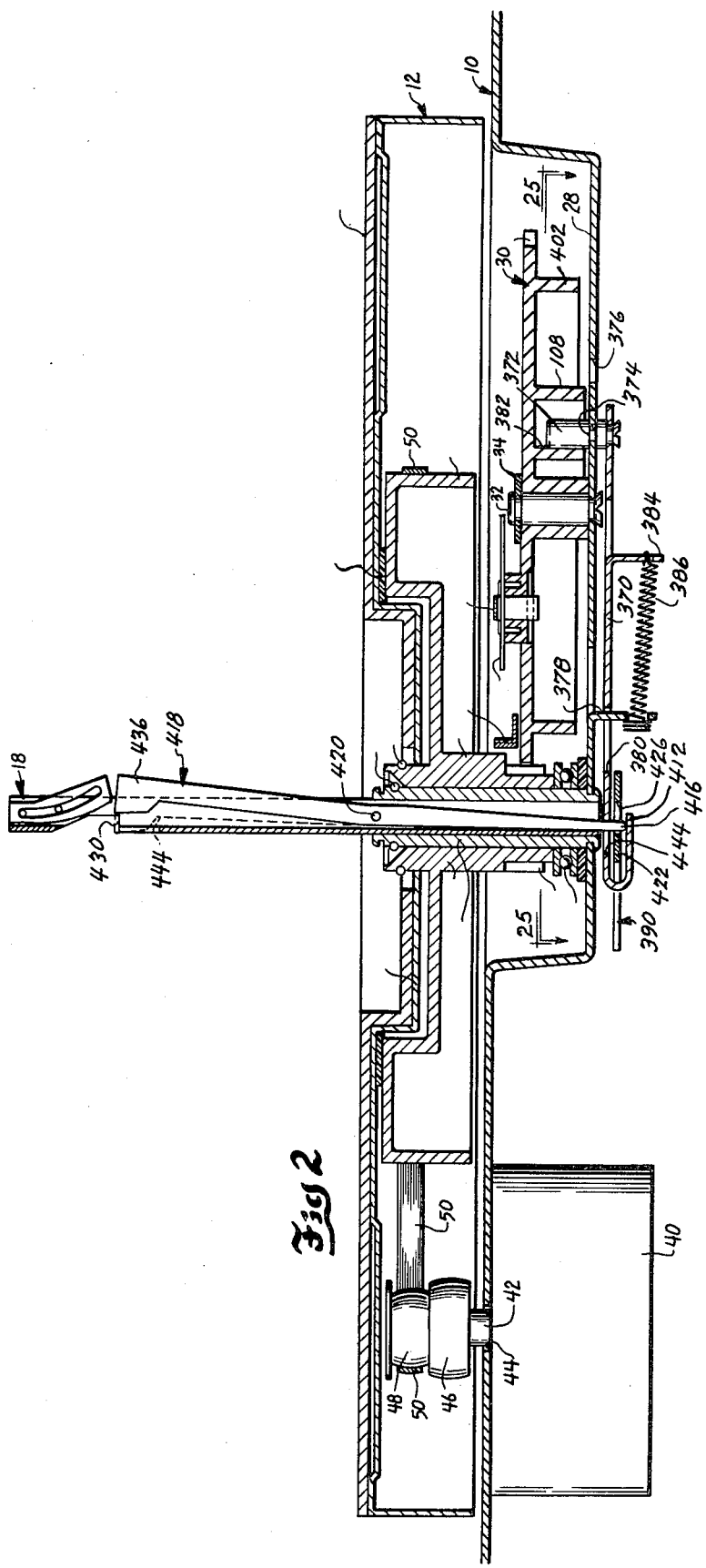

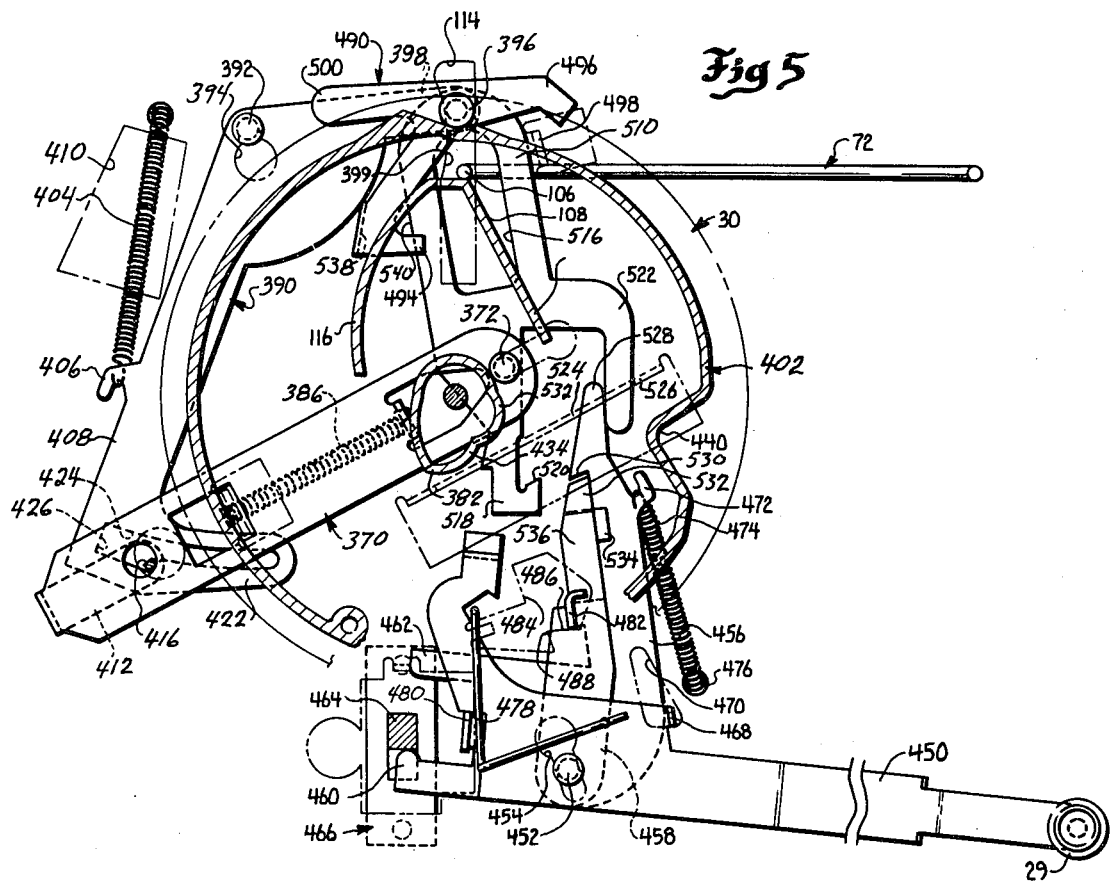

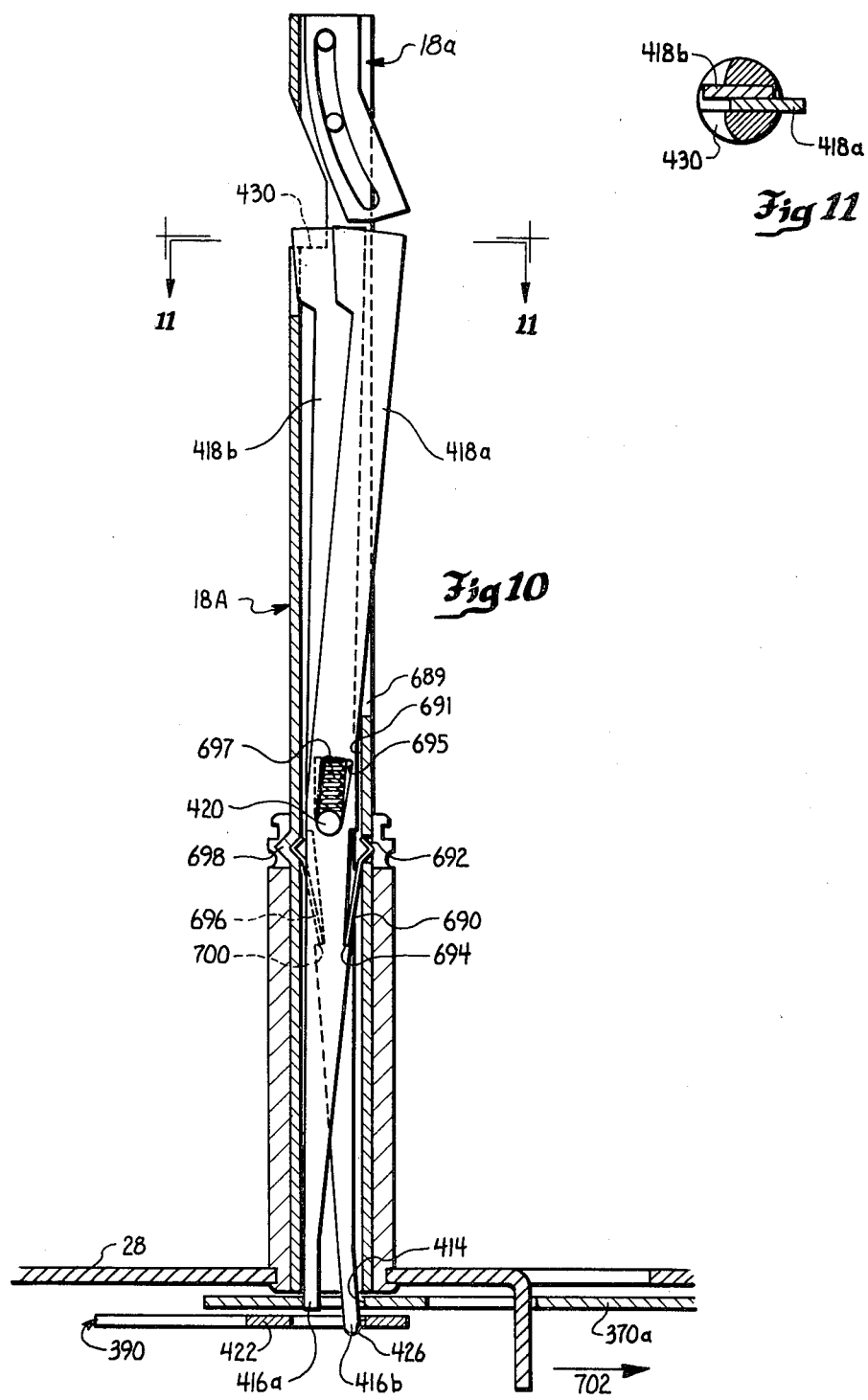

AUTOMATIC RECORD PLAYER

The present invention is a division of my copending application Ser. No. 9,254, filed Feb. 5, 1979, and now U.S. Pat. No. 4,291,886 which is itself a continuation of parent application Ser. No. 813,225, filed July 5, 1977, now abandoned.

The present invention relates to record changers, and more particularly, to automatic record changers which are arranged to play a series of phonograph records in the order in which the records are placed on the centering spindle of the record changer.

Briefly, in accordance with the present invention an extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is accidentally moved or restrained during the record changing cycle. The presence or absence of a record on the spindle shelf is sensed by blade means which is moved in the direction of the shelf during the initial portion of the record changing cycle. If no record is present on the shelf, somewhat before mid cycle the tone arm is lowered into engagement with a retaining notch on the rest post and the turntable motor is turned off at the end of this last record shutoff cycle.

The invention both as to its organization and method of operation, together with further objects and advantages thereof, will best be understood by reference to the following specification taken in connection with the accompanying drawings.

FIG. 1 is a top plan view of the record changer of the present invention with a portion of the turntable broken away to show a portion of the record changing mechanism;

FIG. 2 is a fragmentary sectional view taken along the lines 5—5 of FIG. 1;

FIG. 3 is a fragmentary external view similar to FIG. 2 but taken on a larger scale;

FIG. 4 is a fragmentary sectional view taken along the center line of the main cycling gear of FIG. 1;

FIG. 5 is a fragmentary sectional view taken along the line 25—25 of FIG. 2 and showing the control knob of the changer of FIG. 1 in the OFF position;

FIG. 6 is a perspective view of the flat spring blocking member employed in the changer of FIG. 1.

FIG. 7 is a fragmentary sectional view taken along the line 7—7 of FIG. 5;

FIGS. 8 and 9 are fragmentary sectional views similar to FIG. 3 but showing the parts in different positions of a last record sensing cycle;

FIG. 10 is a sectional elevational view of an alternative record sensing arrangement of the present invention; and FIG. 11 is a sectional view taken along the line 39—39 of FIG. 10.

Referring now to the drawings, the automatic record changer of the present invention is therein illustrated as comprising a metal base plate indicated generally at 10 on which is mounted a rotatable turntable indicated generally at 12, a tone arm indicated generally at 14, and a balance arm indicated generally at 16. The turntable 12 is mounted for rotation about a centering spindle indicated generally at 18 on which a stack of records may be supported and the balance arm 16 moved from its rest position somewhat beyond the position shown in FIG. 1 to a position over the records so that these records are balanced on the record supporting shelf of the spindle 18.

The tone arm 14 is rotatably mounted on a tone arm housing subassembly indicated generally at 20, the housing 20 being provided with a rest post portion 22 which extends upwardly from the housing 20 and is provided with a relatively deep notch 24 in the top thereof within which the tone arm 14 may be seated when the record changer is turned off.

A multi-function control knob 29 is provided which has four positions, namely, an OFF position, a REPEAT PLAY position, an ON position and a REJECT position, from front to back of the changer. When the knob 29 is moved from the OFF position to the ON position the driving motor for the turntable 12 is energized and when the knob 29 is moved to the REJECT position a record changing cycle is automatically initiated. The base plate 10 is provided with a central depressed portion 28. A cycling gear indicated generally at 30 is rotatably mounted on a post 32 which is secured in the central base plate portion 28 and extends upwardly therefrom, the gear 30 being retained on the post 32 by any suitable means.

In order to drive the turntable hub 38 a turntable driving motor 40 (FIG. 5) is mounted on the underside of the base plate 10 beyond the portion 28 and the shaft 42 thereof extends upwardly through an opening 44 in the base plate 10. A drive turret having a 45 rpm step 46 and a 33 rpm step 48 is mounted on the shaft 42 above the base plate 10 and a flexible belt 50 is employed to interconnect one of the turret steps 46, 48 with the turntable hub 38, the belt 50 riding on the periphery of the hub 38.

In the record changer of the present invention, the last record sensing mechanism is combined with the record ejecting mechanism provided at the spindle 18. With this arrangement the balance arm may be of simple construction and need not include any last record shut-off facilities as is conventional in many changers. Furthermore, by accomplishing the last record sensing in the area of the spindle 18 and gear 30, the record changer mechanism is substantially simplified and no interconnection with the tone arm mechanism other than the above-described members 72 and 120 is required. This arrangement has the further advantage of rendering the record changer less sensitive to warpage and bending of the main base plate 10 and hence misalignment of the tone arm area with respect to the center of the base plate.

In accordance with an important aspect of the present invention, the last record sensing operation is accomplished by movement of the record ejector blade in the same direction as this blade moves to eject a record from the shelf of the spindle 18. Such an arrangement substantially simplifies the last record sensing mechanism, as will be described in more detail hereinafter. Considering first the elements provided for ejecting a record from the shelf of the spindle 18, a push-off slide 370 (FIG. 2) is slidably mounted beneath the central portion 28 of the base plate 10. More particularly, the slide 370 is provided with a cam follower pin 372 which is secured to one end of the slide 370. The pin 372 is provided with a groove 374 which rides in the narrow portion of a keyhole slot 376 formed in the central portion 28 of the base plate 10. A flange 378 extends downwardly therefrom through an opening 380 in the push-off slide 370, the flange 378 engaging the sides of the opening 380 so that the slide is guided by means of the flange 378 and slot 376 for reciprocal movement with respect to the base plate portion 28. A push-off slide actuating cam indicated generally at 382 is formed on the underside of the main gear 30 and extends downwardly therefrom. The slide 370 is provided with a downturned flange portion 384 and a spring 386 is connected between the flange 378 and the flange 384 so as to bias the cam follower pin 372 into engagement with the outer surface of the cam 382. It will be noted that the spring 386 is connected to the flange 378 at a point closer to the base plate than the other end of the spring 386. Accordingly, the spring 386 also provides an upward bias on the slide 370.

In order to detent the main gear 30 in its home or detent position shown in FIG. 1 during periods between record changing cycles, a detent lever indicated generally at 390 (FIG. 5) is pivotally mounted on the base plate portion 28. More particularly, the lever 390 is provided with a pin 392 which extends into a keyhole slot 394 formed in base plate portion 28. A detent pin 396 is secured to an arm portion 398 of the lever 390 and extends upwardly through the opening 114 in the base plate portion 28. The detent pin 396 is biased into engagement with a main control cam indicated generally at 402 which is formed integrally with the main gear 30 and extends downwardly therefrom. The control cam 402 is provided with a notch portion into which the detent pin 396 is biased by means of a spring 404 which is connected between a projection 406 formed in the arm 408 of the detent lever 390 and an opening 410 in the base plate portion 20. The spring 408 tends to rotate the lever 390 about the pivot pin 392 so that the detent pin 396 is held in the notch 405 when the gear 30 is in its home or detent position. The detent pin 396 is provided with a groove 397 (FIG. 4). One edge of the groove 397 moves along the arcuate edge portion 399 of the opening 114 in the base plate portion 38. With this arrangement the detent pin 396 is stabilized as the detent lever 390 is pivoted about the pin 392.

The push-off slide 370 is provided with a U-shaped end portion which defines a tab portion 412 (FIG. 2) which is positioned below the main portion of the push-off slide 370 and is immediately below an opening 414 in the slide 370 through which the lower end portion 416 of a record ejector blade indicated generally at 418 is positioned. The blade 418 is pivotally mounted in the body of the spindle 18 by means of a pin 420. The detent lever 390 is provided with an offset portion 422 (FIG. 5) at the end of the arm 408 which extends between the push-off slide 370 and its tab portion 412, as best illustrated in FIG. 2. The portion 422 of the detent lever 390 is provided with an arcuate narrow slot 424 (FIG. 5) which opens into a relatively wide slot 426, the intersection of the slots 424 and 426 defining an interference shoulder 428 in the vicinity of the end portion 416 of the ejector blade 418.

Since the spring 404 is connected to the base plate portion 28 it urges the portion 422 of the detent lever 390 upwardly into engagement with the push-off slide 370 and hence exerts an upward bias on the slide 370 in addition to the bias provided by the spring 386. With this arrangement the tab portion 412 of the push-off slide 370 exerts a slight upward force on the end of the record ejector blade portion 416. This force is employed during the last record sensing operation described in more detail hereinafter.

Considering first the operation of the push-off slide 370 in ejecting a record which is seated on the shelf 430 of the spindle 18, and assuming that a record changing cycle has been initiated in the manner described in detail heretofore, the push-off slide actuating cam 382 is provided with a first lobe portion 432 (FIG. 5) which functions to move the push-off slide 370 a slight amount during the initial or record sensing portion of the record changing cycle. During engagement of the pin 372 with the lobe 432 of the cam 382 the push-off slide 370 is moved from the position shown in FIG. 2 to the position shown in FIG. 8. During this movement the slight force which is exerted by the tab portion 412 on the end of the record ejector blade portion 416 is insufficient to move a record seated on the shelf 430 off of this shelf. As a result, the end portion 416 remains in the position shown in full lines in FIG. 8 as the slide 370 is moved to the right during engagement with the cam lobe portion 432. During this movement of the slide 370 the ejector blade end portion 416 is not moved since the opening 414 in the slide 370 provides clearance between the slide 370 and the end portion 416 during the record sensing portion of the record changing cycle. However, when the pin 372 engages the record ejecting lobe portion 434 on the cam 382, so that the push-off slide 370 is moved farther to the right as viewed in FIG. 2, the end portion 416 of the ejector blade 418 is engaged by the edge of the opening 414 in the slide 370 and is moved to the position shown in FIG. 9. During this push-off movement of the ejector blade 418, the upper portion 436 of the blade 418 engages the bottom record seated on the shelf 430 and moves this record off of the shelf so that the bottom record is deposited on the turntable 12. In this connection it will be understood that the position of the cam 382 on the gear 30 is so related to the position of the tone arm cam 108 that the tone arm 14 has been lifted upwardly and moved outwardly beyond the edge of the record stack before the end portion 436 of the record ejector blade has moved the bottom record off of the shelf 430. After the record has been ejected the spring 386 continues to bias the pin 372 into engagement with the cam 382 as the main gear 30 is rotated through the remainder of the record changing cycle. If desired, the ejector blade 418 may be provided with an elongated vertical slot for the pin 420 and is normally spring-biased so that the pin 420 is in the bottom of this slot. With such an arrangement the ejector blade may be depressed to the level of the shelf 430 by the record stack above the bottom record as the bottom record is ejected. The weight of the record stack is thus removed from the upper end of the blade 418 which facilitates return of the blade 418 to its rest position under the force of the return spring 386 through the slide 370. Such a spring-biased arrangement is shown and described in connection with the embodiment of FIGS. 10 and 11.

Considering now the manner in which the absence of a record on the shelf 430 is sensed in accordance with the arrangement of the present invention, the control cam 402 on the main gear 30 is provided with a deep notch portion 440 (FIG. 5). During a normal record changing cycle, and assuming a record is seated on the shelf 430, when the gear 30 has been rotated an amount such that the detent pin 396 is opposite the notch 440 the spring 404 tends to rotate the detent lever 390 and move the detent pin 396 into the notch 440 but this action is prevented by engagement of the record ejector blade portion 416 with the interference shoulder 428 formed in the end portion 422 of the detent lever 390. In this connection it will be recalled that the light frictional force exerted on the end portion 416 by the tab 412 is insufficient to move the ejector blade 418 when a record is seated on the shelf 430. However, if no record is present on the shelf 430, during the initial record sensing portion of the cycle, i.e. during the period when the pin 372 engages the lobe 432 of the cam 382 and the slide 370 is moved from the position shown in FIG. 2 to the position shown in FIG. 8, the light force exerted on the end of the record ejector blade portion 416 is sufficient to move the ejector blade to the dotted line position 442 shown in FIG. 8. This movement of the bottom end of the ejector blade portion 416 causes a corresponding movement of the upper end 436 to the dotted line position 444 shown in FIG. 2. This last record sensing movement of the end portion 416 by engagement with the tab 412 takes place just prior to the point in the record changing cycle at which the detent pin 396 is opposite the notch 440. Accordingly, when the detent pin 396 encounters the notch 440 the ejector blade portion 416 is now moved into alignment with the notch 424 on the end portion 422 of the detent lever 390 so as to permit the spring 404 to rotate the detent lever 390 and move the detent pin 396 into the bottom of the notch 440. This inward movement of the detent pin 396 toward the center of the gear 30 is employed to turn off the motor 40 in accordance with a last record shut-off mechanism which will now be described.

Considering first the control linkage which is employed to turn on and off the motor manually, a control knob 29 is connected to the end of an on-off lever 450 (FIG. 5) which is rotatably mounted on a pin 452. The pin 452 is itself connected to a switch actuating plate 456 which is positioned below the lever 450. The pin 452 is provided with a groove which rides in the narrow portion of a keyhole slot 454 formed in the base plate portion 28. A flat spring blocking member 458 is positioned between the lever 450 and the plate 456 and is secured to the pin 452. More particularly, the pin 452 is provided with a first portion 453 of reduced diameter on which the on-off lever 450 is pivotally mounted. The pin 452 is also provided with a portion 455 of still smaller diameter which defines a shoulder 457 against which the blocking member 458 and switch actuating plate 456 are held by staking the end of the pin 452 so that the members 452, 456 and 458 move together. The plate 456 carries a pair of switch actuating arms 460 and 462 which are positioned on either side of the actuating button 464 of a slide switch indicated generally at 466. The on-off lever 450 is provided with an upwardly extending tongue portion 468 which extends into a triangularly shaped opening 470 in the base plate portion 28. The switch actuating plate 456 is provided with a projecting lug portion 472 to which one end of a spring 474 is connected, the other end of the spring 474 being connected to an opening 476 (FIG. 1) in the base plate portion 28. The on-off lever 450 is provided with a shoulder 478, FIG. 5 which is normally held in engagement with an upturned flange portion 480 on the switch actuating plate 456. In the OFF position of the control knob 29 the spring 474 functions to rotate the plate 456 so that the flange 480 thereof is in engagement with the shoulder 478 and the lever 450 is also rotated until the tongue 468 hits one end of the slot 470. In the OFF position of the plate 456 the arm 460 retains the switch button 464 of the switch 466 in the OFF position shown in FIG. 5.

The switch actuating plate 456 is provided with an upturned right angle flange portion 482 which extends upwardly through a notch 483 (FIG. 6) in the blocking member 458 and an irregularly-shaped opening 484 in the base plate portion 28. In the OFF position of the lever 450 one edge of the flange 482 rides on the curved edge portion or shoulder 486 of the opening 484 and is positioned substantially away from a right angle edge portion 488 of the opening 484, the surfaces 486 and 488 forming an essentially right-angled shoulder or corner. When the lever 450 is moved upwardly (as viewed in FIG. 5) toward the ON position the lever 450 and plate 456 move as a unit so that the flange 482 rides along the surface 486. However, as soon as the edge of the flange 482 is moved beyond the edge of the curved surface 486 the spring 474 moves the plate 456 with a snap action to the ON position as the pin 452 moves to the bottom of the elongated slot 454. At the same time, the arm 462 of the plate 456 engages the button 464 and moves the switch 466 to the ON position with a quick snap action movement. During this movement of the plate 456 the flange 482 drops down beside the surface 488 of the base plate opening 484. As soon as the flange 482 moves beyond the edge of the curved surface 486 the linkage 450, 456 actually pivots about the end of the on-off lever 450 which is being held by the operator. However, the flange 482 is biased into engagement with the surface 488 by the spring 474 and holds the lever 450 in the detented ON position.

When the control knob 29 is moved from the ON to the OFF position manually the on-off lever 450 rotates about the tongue 468 as a fulcrum and lifts the pivot pin 452 within the notch 454. However, until the flange 482 has been moved inwardly by an amount sufficient to clear the inner edge of the surface 488 the spring 474 is unable to rotate the plate 456 and actuate the switch 464. Accordingly, it is not until the plate 456 has been moved inwardly by an amount sufficient to cause the flange 482 thereof to engage the curved surface 486 that the spring 474 then rotates the plate 456 about the pin 452 with a snap action and the arm 460 at this time moves the button 464 so that the switch 466 is turned to the OFF position. It will be noted that the above-described on-off control linkage is effective to provide a snap action actuation of the switch 466 so that a relatively simple and inexpensive slide switch 466 may be employed to turn on and off the motor 40. A more expensive switch would be required if the on-off control linkage were such that the switch 466 could be held momentarily in a mid position which could cause damage to the switch contacts. However, with the above-described control linkage of the present invention it is impossible for the operator by movement of the control knob 29 to position the switch 466 in a position intermediate the ON or the OFF positions due to the above described snap action of the flange 482 with respect to the shoulder 486, 488.

Considering now the automatic shut-off mechanism of the present invention which cooperates with the abovedescribed on-off control linkage to turn off the machine when the detent pin 396 enters the notch 440 in the control cam 402, it is first noted that this shut-off action is accomplished during the same record changing cycle during which the absence of a record on the shelf 430 is detected by movement of the end portion 416 during the sensing portion of the record changing cycle. As described generally heretofore, the tone arm 14 is moved outwardly during the record changing cycle until it strikes the back wall 184 of the tone arm rest post 22, during the mid portion of the record changing cycle. In accordance with an important feature of the present invention the tone arm is lowered during the period when it is in engagement with the back wall 184 of the rest post 22 so that the tone arm is lowered into the notch 24 during the mid portion of the last record shut-off cycle. Furthermore, the tone arm remains in this somewhat lowered position during the remainder of a last record shut-off cycle so that the tone arm is not moved back inwardly as the gear 30 rotates back to its detent position.

In order to lower the tone arm to an intermediate position within the rest post notch 24 after the tone arm has engaged the back wall 184, a tone arm latch member indicated generally at 490 (FIG. 5) is pivotally mounted on the detent pin 396. More particularly, the detent pin 396, which is staked to the detent lever 390 is provided with a shoulder portion 492 (FIG. 4) on which the tone arm latch 490 is pivotally mounted, the latch 490 being preferably made of thin spring stock, or the like. The tone arm latch 490 is provided with an inwardly extending hook portion 494 (FIG. 5) and an extension arm portion 496 which is adapted to engage a downturned flange portion 498 of the base plate portion 28 when the detent pin 396 enters the notch 440. The tone arm latch 390 is also provided with an arm portion 500 which rides on the surface 502 of the detent lever 390 to stabilize the tone arm latch 490 during pivotal movement thereof.

In order to actuate the on-off control linkage 450, 456 to turn off the motor 40 when the detent pin 396 enters the notch 440, a shut-off latch indicated generally at 510 (FIG. 5) is also pivotally mounted on the detent pin 396 and rotates on a shoulder formed by the reduced end portion 512 (FIG. 4) of the detent pin, the shut-off latch being retained on the end portion 512 by means of the C washer 514. The shut-off latch 510 is provided with a clearance opening 516 (FIG. 5) to accommodate movement of the lift rod end portion 106 and includes a first arm extension 518 which terminates in a hook portion 520, and an offset arm extension 522. Both of the arms 518 and 522 of the latch 510 are positioned in a slot 524 formed in a downturned flange portion 526 of the base plate portion 28. Also, the tip portion 528 of the switch actuating plate 456 also extends through the slot 524. The switch actuating plate 456 is also provided with a hook portion 530 immediately adjacent the inclined end portion 532 of the flat spring blocking member 458. The flat spring blocking member 458, which is positioned between the on-off lever 450 and the switch actuating plate 456 is provided with a notch to receive the right angle flange 482 of the switch actuating plate 456 so that the members 456 and 458 move together. However, the flat spring blocking member 458 is provided with an offset flange 534 which spaces the intermediate portion 536 of the flat spring member 458 below the plane of the members 456 and 518.

During a normal record changing cycle the shut-off latch 510 is never moved to a position in which the hook portion 520 thereof can become aligned with the hook portion 530 on the switch actuating plate 456. This is because the detent pin 396 never enters the notch 440 during a normal record changing cycle, as described in detail heretofore. However, when the detent pin 396 enters the notch 440 the shut-off latch 510 is moved so that the arm 518 thereof extends further through the slot 524. Also, when the detent pin 396 enters the notch 440 the tone arm latch 490 is pivoted by engagement of the arm 496 thereof with the flange 498, as described heretofore. When the tone arm latch 430 pivots, a downturned flange portion 538 (FIG. 5) thereof engages the edge 540 of the shut-off latch 510 and pivots it about the detent pin 396.

In this position the hook portion 520 is positioned in alignment with the hook portion 530 on the switch actuating plate 456. Accordingly, as the detent pin 396 moves out of the notch 440, i.e. the hook portion 520 raises the inclined end portion 532 of the flat spring 458, moves into engagement with the hook portion 530 and after engagement of the members 520 and 530 lifts the on-off linkage 450, 456 slightly so that the pivot pin 452 is moved upwardly in the keyhole slot 454. By positioning all of the members 522, 528 and 518 in the common slot 524 the engagement and hooking of the members 520 and 530 is insured without misalignment during a shut-off cycle.

The members 520 and 530 remain in the above-described hooked position as the detent pin 396 rides around the periphery of the control cam 402. However, near the end of the record changing cycle the detent pin 396 encounters an outwardly projecting inclined portion of the control cam 402 which functions to move the switch actuating plate 456 toward the center of the gear 30 by an amount sufficient that the flange 482 thereof is moved inwardly beyond the end of the surface 488 in the base plate portion 28. When this occurs, the spring 474 exerts a sidewise pressure on the interconnected members 510 and 456 which is sufficient to move the edge of the flange 482 to the right so that the edge of the flange 482 is now above the forward edge of the curved surface 486 while the shut-off latch 510 remains in latched engagement with the switch acuating plate 456. However, the arm 522 of the latch 510 engages the end of the slot 524 in the flange 526 and blocks the arm 528 of the plate 456 so that the plate 456 is prevented from rotating to the OFF position and the motor 40 continues to be energized. It is necessary to continue energization of the motor 40 because the disclosed belt drive of the turntable 12 has relatively little coast after the motor is de-energized and the gear 30 might not be returned to the notch 405. If an idler wheel drive arrangement is employed for the turntable 12 considerable coast is provided so that the motor could be turned off earlier in the cycle.

As the gear 30 continues to rotate the detent pin 396 moves down an inclined portion of the control cam 402. During this movement the edge of the flange 482 on the switch actuating plate 456 strikes the curved surface 486 which blocks further movement of the hook portion 530 while the hook portion 520 of the shut-off latch 510 continues to move away from the hook 530. As soon as the latch portions 520, 530 become disengaged, the spring 474 rotates the switch actuating plate 456 while the edge of the flange 482 rides on the curved surface 486 as a pivot. During this rotation of the switch actuating plate 456 the arm 460 thereof engages the switch button 464 and moves the slide switch 466 in a snap action to the OFF position. When the switch 466 is opened the motor 40 is de-energized and the gear 30 is moved into the detent notch 405 on the control cam 402 by the force exerted thereon from the spring 404 through the detent lever 390 and the detent pin 396.

In FIGS. 10 and 11 there is shown an alternative last record sensing embodiment of the present invention wherein a last record sensing force which is somewhat greater than the force employed in the embodiment of FIG. 2, may be utilized without causing ejection of the bottom record during the last record sensing operation.

Referring to these figures, two relatively thin blades 418a and 418b are mounted on the common pivot 420 within the body of the spindle 18A. The upper portion of the body of the spindle 18A is milled to provide a slot 689 for receiving the upper portions of the blades 418a, 418b and the lower portion of the spindle body is provided with a bore 691 which communicates with the slot 689. The first pivotally mounted blade 418a acts as a record ejector blade to eject the bottom record seated on the shelf 430 off of this shelf. However, the bottom portion 416a of the blade 418a does not extend below the bottom surface of the pushoff slide 370a. Also, the blade 418a is biased to its rear position shown in full lines in FIG. 10 by means of a flat spring 690 which is positioned between a shoulder 694 formed in the back edge of the blade 418a and an opening 692 in the lower portion of the spindle body. The spring 690 continuously urges the ejector blade rearwardly away from the shelf 430 but is overcome by engagement of the bottom end portion 416a with the pushoff slide 370a during the record ejecting portion of a record changing cycle, as described in detail heretofore.

The pushoff slide 370a is substantially identical to the slide 370 described in detail heretofore except for the fact that the tab portion 412 of the slide 370 is eliminated in the embodiment of FIGS. 10 and 11. Also, the spring 386 may be somewhat lighter in the embodiment of FIGS. 10 and 11 since it is aided by the spring 690 insofar as biasing the ejector blade 418a to its rear position is concerned.

The second blade 418b is also pivotally mounted on the same pin 420 within the body of the spindle 18a and acts solely as a record sensing blade to sense the presence or absence of a record on the shelf 430 during the initial sensing portion of the record changing cycle. The end portion 416b of the blade 418b does extend downwardly below the bottom surface of the slide 370a and into the slot 426 in the offset portion 422 of the detent lever 390. The end portion 416b thus acts as a blocking member for the detent lever 390, in the same manner as the end portion 416 of the blade 418 in the embodiment of FIG. 2, previously described, during record changing cycles other than a last record shut-off cycle. A second flat spring 696 is positioned between an outwardly formed notch portion 698 in the body of the spindle 18a and a shoulder portion 700 formed in the forward edge of the sensing blade 418b. The notch 698 is formed in the spindle body after the central bore is made by inserting a tool through the opening 692 and deforming the wall of the spindle body outwardly as will be readily apparent to those skilled in the art. The spring 696 continuously exerts a force on the blade 418b tending to move the upper end of this blade in the direction of the record supporting shelf 430. However, the force exerted by the spring 696 on the blade 418b is somewhat less than the force exerted by the spring 690 on the blade 418a.

Both of the blades 418a and 418b are provided with elongated slots 695 within which the common pin 420 is located. A single spring 697 is positioned in the slots 695 and normally urges the pin 420 to the bottom of these slots. Such construction permits the blades 418a and 418b to be depressed by the records above the bottom record when the bottom record is ejected from the shelf 430, as discussed heretofore in connection with the embodiment of FIG. 2. Preferably, the slots 695 are slightly wider at the top to accommodate movement of the blade 418b relative to the blade 418a when the absence of a record on the shelf 430 is sensed by movement of the blade 418b.

If a record is present on the shelf 430, during the initial sensing portion of the record changing cycle the spring 696 urges the upper end of the sensing blade into engagement with the edge of the bottom record adjacent the shelf 430 while at the same time the spring 690 urges the upper end of the ejector blade 418a into engagement with the opposite edge of the bottom record. Since the spring 690 is stronger than the spring 696, the sensing blade 418b is unable to move the bottom record off of the shelf 430 and the blades 418a and 418b remain in substantial alignment during the sensing portion of the record changing cycle. Accordingly, in the embodiment of FIGS. 10 and 11 a substantial force may be exerted on the sensing blade 418b to move this blade in the absence of a record on the shelf 430 while at the same time positively insuring that the force exerted by the blade 418b on a record seated on the shelf 430 will not be sufficient to eject the record, due to the large force exerted on the back edge of the bottom record by the ejector blade 418a.

Assuming still that a record is positioned on the shelf 430, as the record changing cycle continues after the last record sensing portion thereof, the end portion 416a is engaged by the back edge of the opening 414 in the slide 370a so that the blade 418a is moved into engagement with the bottom record on the shelf 430 and moves it off of the shelf and onto the turntable 12. As this occurs, the blade 418b is continuously urged in the direction of the shelf 430 by the spring 696 and hence follows movement of the ejector blade 418a as it moves the bottom record off of the shelf 430.

As soon as the last record is moved off of the shelf 430, the sensing blade 418b is moved to the last record shut-off position shown in full lines in FIG. 10 by the spring 696. The last record is not moved off of the shelf 430 before the detent pin 396 has passed the notch 440 in the cam 402 so that even though the bottom portion 416b of the blade 418b is moved out of its blocking position with respect to the detent lever portion 422 no last record shut-off cycle is established and the last record is thereafter played in the normal manner. However, during the last record sensing portion of the next record changing cycle the detent pin 396 is permitted to enter the notch 440 and a shut-off cycle is set up so that the changer is turned off at the end of this cycle, as described in detail heretofore. During this shut-off cycle the ejector blade 418a is moved by engagement of the end 416a thereof with the back edge of the opening 414 in the slide 370a but this movement has no effect on the last record shut-off mechanism since the end portion 416a of the blade 418a is cut off and does not extend into the path of the detent lever 390.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In an automatic record player, the combination of, a rotatable turntable, a centering spindle positioned at the center of said turntable, means defining a shelf on one side of said centering spindle on which said bottom stack of records may be seated during a playing cycle, automatic record playing means operative during an automatic cycle to deposit the bottom record of said stack onto said turntable, record sensing means including blade means mounted on said spindle and having an upper portion adapted to engage the edge of the centering hole of said bottom record seated on said shelf, and means operative during an automatic cycle for urging said upper portion of said blade means in the direction of said shelf with a sufficiently light force that said blade means is restrained by the edge of a record seated on said shelf without moving said record off of said shelf, said force being sufficient in the absence of a record on said shelf to move said blade means in said direction to a shut-off position.

2. The combination of claim 1, which includes means for rotating said turntable during a record playing cycle, and means responsive to movement of said blade means to said shut-off position for disabling said turntable rotating means.

3. In an automatic record changer, the combination of, a rotatable turntable, a centering spindle positioned at the center of said turntable, means defining a shelf on one side of said centering spindle on which a stack of records may be seated during a playing cycle, automatic record changing means operative during a record changing cycle to deposit the bottom record of said stack onto said turntable, said automatic record changing means including a last record sensing blade mounted on said spindle and having an upper portion adapted to engage the edge of said bottom record in the vicinity of said shelf, and means operative during a record changing cycle for moving said upper portion of said blade in the direction of said shelf with a small force which is insufficient to enable said blade to eject a record if a record is seated on said shelf but is sufficient to move said blade to a shut-off position in the absence of a record on said shelf.

4. The combination of claim 3, which includes means for rotating said turntable during a record playing cycle, and means responsive to movement of said blade to said shut-off position for de-energizing said turntable rotating means.

5. In an automatic record changer, the combination of, a rotatable turntable, a centering spindle positioned at the center of said turntable, means defining a shelf on one side of said centering spindle on which a stack of records may be seated during a playing cycle, blade means mounted on said spindle, means operative during one portion of the record changing cycle for moving said blade means to a record ejecting position, whereby said blade means engages the bottom record of a stack of records seated on said shelf and moves said bottom record off of said shelf, and last record sensing means operative during a different portion of the record changing cycle for moving said blade means in the direction of said shelf with a light force which is sufficient to move said blade means to a shut-off position when no record is positioned on said shelf, said light force being insufficient to move said blade means to said record ejecting position when a record is seated on said shelf.

6. In an automatic record changer, the combination of, a rotatable turntable, a centering spindle positioned at the center of said turntable, means defining a shelf on one side of said centering spindle on which a stack of records may be seated, a record ejector blade mounted on said spindle, means operative during one portion of the record changing cycle for moving said record ejector blade to a record ejecting position, whereby said record ejector blade engages the bottom record of a stack of records seated on said shelf and moves said bottom record off of said shelf, a last record sensing blade mounted on said spindle and movable independently of said record ejector blade, and means operative during a different portion of the record changing cycle for moving said last record sensing blade in the direction of said shelf with a light force which is sufficient to move said last record sensing blade to a shut-off position when no record is positioned on said shelf, said light force being insufficient to move said last record sensing blade to said record ejecting position when a record is seated on said shelf.

7. The combination set forth in claim 6, which includes means for biasing said ejector blade to a position in which said ejector blade engages the edge of the bottom record positioned on said shelf, said bias opposing the force exerted on the bottom record by said sensing blade.

8. The combination set forth in claim 5, which includes a base member, a control member movably mounted on said base member and in engagement with the lower end of said blade means, and means for moving said control member during said different portion of a record changing cycle so that the upper end of said blade means is moved in the direction of said shelf, the engagement of said control member with said lower end of said blade means being sufficiently light that said blade means slips with respect to said control member when said upper end encounters a record seated on said shelf.

9. The combination set forth in claim 8, wherein said control member is provided with a horizontal portion on which said lower end of said blade means rests, and means for urging said blade means into engagement with said horizontal portion to provide said light force.

10. The combination set forth in claim 9, wherein said control member is provided with a portion above said horizontal portion and having an opening therein, said lower end of said blade means extending through said opening, said control member moving said blade means to eject a record during said one portion of the record changing cycle by engagement of said blade means with the edge of said opening.

11. In an automatic record changer, the combination of, a rotatable turntable, means for rotating said turntable during a record playing cycle, a centering spindle positioned at the center of said turntable, means defining a shelf on one side of said centering spindle on which a stack of records may be seated, automatic record changing means operative during a record changing cycle to deposit the bottom record of a stack of records seated on said shelf onto said turntable, last record sensing means including blade means mounted on said spindle and having an upper portion adapted to engage said bottom record, a pivotally mounted member, said blade means normally blocking movement of said pivotally mounted member, means for exerting a light force on said blade means tending to move said upper portion thereof toward said shelf, whereby said blade means is moved to a shut-off position in the absence of a record on said shelf, means responsive to movement of said blade means to said shut-off position for moving said pivotally mounted member to an off position, and means responsive to movement of said pivotally mounted member to said off position for disabling said turntable rotating means at the end of the same record changing cycle.

12. In an automatic record changer, the combination of, a rotatable turntable, means for rotating said turntable during a record playing cycle, a centering spindle positioned at the center of said turntable, means defining a shelf on one side of said centering spindle on which a stack of records may be seated, a main cycling gear, means for rotating said gear one revolution during a record changing cycle, automatic record changing means responsive to rotation of said gear for depositing the bottom record of a stack of records seated on said shelf onto said turntable, last record sensing means including blade means mounted on said spindle and having an upper portion adapted to engage said bottom record, a cam on said gear and having a notch therein, a pivotally mounted cam follower member, means for biasing said member into engagement with said cam, said blade means being normally positioned to prevent said cam follower member from following said notch when a record is positioned on said shelf, means for exerting a light force on said blade means tending to move said upper portion thereof toward said shelf, whereby said blade means is moved to a shut-off position in the absence of a record on said shelf, said light force being insufficient to move said blade means to said shut-off position when a record is positioned on said shelf, said blade means when in said shut-off position being positioned to permit said cam follower member to enter said notch, and means responsive to movement of said cam follower member into said notch for disabling said turntable rotating means.

13. The combination of claim 12, wherein said turntable rotating means is disabled at the end of the same record changing cycle in which said blade means is moved to said shut-off position.

14. The combination of claim 13, which includes means operative after said cam follower member has passed said notch in said cam for moving said blade means to push a record seated on said shelf off of said shelf.

15. The combination of claim 12, which includes a control member having a surface in frictional engagement with the bottom end of said blade means, and means for moving said control member during said record changing cycle, thereby to exert said light force on said blade means by virtue of said frictional engagement with the bottom end thereof.

16. The combination of claim 15, which includes a lost motion connection between said control member and said blade means, said lost motion connection providing a positive drive connection between said control member and said blade means after said frictional engagement thereof which exerts a relatively large force on said blade means which is sufficient to move the bottom record off of said shelf.

17. The combination of claim 16, wherein said lost-motion connection comprises means defining an opening in a portion of said control member above the end of said blade means, said light force being exerted on said blade means during the portion of movement of said control member in which said blade means is not engaged with said portion of said control member having said opening therein.

18. The combination of claim 12, wherein said cam follower member includes a pin in engagement with said cam, a shut-off latch pivotally mounted on the axis of said pin, said disabling means includes manually operable on-off lever means, means for interconnecting said shut-off latch and said on-off lever means in response to movement of said pin out of said notch, and means operative near the end of the record changing cycle for moving said interconnected shut-off latch and on-off lever means to a position in which said lever means is moved to the off position thereof.

19. The combination of claim 18, wherein said last named means includes a projection on said cam, a fixed pivot for said on-off lever, said interconnected shut-off latch and on-off lever being moved in one direction as said pin engages said projection so that said on-off lever is moved into alignment with said fixed pivot, said shut-off latch moving said on-off lever into engagement with said pivot as said pin moves out of engagement with said projection, said shut-off latch becoming disengaged from said on-off lever as said pin continues to move away from said projection, thereby permitting said on-off lever to rotate about said fixed pivot to an off position.

20. The combination of claim 12, wherein said cam follower member includes a pin in engagement with said cam, said disabling means including shut-off latch means pivotally mounted on the axis of said pin and operative near the end of the record changing cycle to disable said turntable rotating means.

21. The combination of claim 20, wherein said cam also has a detent notch therein, and said disabling means is responsive to movement of said pin into said detent notch near the end of the record changing cycle for disabling said turntable rotating means.

* * * * *